MODULAR CIRCUITRY APPARATUS

Filed Sept. 14, 1961 2 Sheets-Sheet 1

INVENTOR.
GEORGE J. GIEL
BY
Nilsson & Robbins
ATTORNEYS.

April 21, 1964 G. J. GIEL 3,130,351

MODULAR CIRCUITRY APPARATUS

Filed Sept. 14, 1961 2 Sheets-Sheet 2

INVENTOR.
GEORGE J. GIEL
BY
Nilsson & Robbins
ATTORNEYS.

3,130,351
MODULAR CIRCUITRY APPARATUS
George J. Giel, 801 Bramble Way,
West Los Angeles, Calif.
Filed Sept. 14, 1961, Ser. No. 138,047
8 Claims. (Cl. 317—101)

This invention relates generally to electrical equipment utilizing boards or panels having circuit elements mounted or printed or etched thereon and more specifically to such boards and receptacle devices into which they may be readily removably inserted.

There are in wide use many examples of modern electrical and electronic equipment and systems, such as computers in which it is extremely useful and advantageous to have portions of the circuitry etched, printed, stamped and cemented, or mounted on small boards which are easily and quickly removable for the replacement, testing, or repairing of a faulty or suspect portion. When the system is constructed in this modular manner, it may ve very compact and yet be fully accessible for repair. In addition, the system may be altered or improved by replacing certain of the modular circuit boards with different ones. An unskilled operator may perform many such functions which would otherwise require a specially trained engineer. Further, the mass production manufacturing of circuit modules which may, in some cases, be more or less standardized, as well as their stocking and distribution are made considerably more economic than in the case of conventionally constructed systems.

In the past, these modular circuit boards have been typically provided with conductive contact areas which are pushed into a receptacle having matching spring contacts designed to make a sliding or scrubbing contact with conductive areas on the board. It is a general requirement with any such electrical contact that for reliability of continuous connection there be a positive force holding the two conductive areas in contact. Further, the greater the contact pressure the greater the reliability ranging from a contact pair which intermittently opens, due, for example, to vibration or to differential thermal expansions, to a contact pair with such pressure that relative sliding between the contacts is difficult or is damaging to the contact surfaces. Therefore, in general, contact pressure must be compromised to provide insertion ease and to prevent damage or inelastic springing of the contacts.

It is normally necessary to use a strong elastically bendable material for the receptacle contacts which is not particularly suitable for providing the best and most reliable electrical contact. The contacts must therefore be plated, but again a compromise must be made between a durable plating for the sliding and the scrubbing action and a softer, highly conductive, non-corrosive plating.

A further disadvantage of the prior art is that dimensional tolerances are exceedingly small because an oversized board would decrease the reliability of the receptacle contacts for subsequent boards; and initially undersized boards are not reliable even at the outset.

One typical prior art attempt to solve this critical dimensional aspect has been directed toward providing independently mounted contacts which are finger-like, interleaved, split contacts wherein each member slides between the separated portions of the other. This system, however, requires very small tolerances in the placement and alignment of the contacts to preclude damage from the false or misaligned insertion. In addition, this approach requires an expensive, additional non-printable step in the manufacture of the boards and is also subject to the compromise discussed above regarding contact pressure and plating materials. A further problem involved in the utilization of modular printed circuit boards is that of providing a means for locking the boards securely in place, such that the locking means does not detract from the advantages such as compactness and accessibility otherwise incumbent or available with removable modular boards. Prior art systems have typically required elaborate locking bars over entire sets of inserted panel boards because it would require excessive space and weight to provide a locking bar for each board. However, such an over-all locking bar is, in itself, bulky; and when it is removed to permit withdrawal of one panel, many other panels are affected and may be either directly displaced by the action of the locking bar or be indirectly displaced as by other vibration because they are all free to move when the over-all locking bar is removed.

It is therefore an object of the present invention to provide a modular circuit panel, such as a printed circuit board and a receptacle therefor which is not subject to these and other disadvantages.

It is another object to provide such apparatus which provides, when desired, very high electrical contact pressure.

It is another object to provide such apparatus which requires substantially no sliding or scrubbing between the contact surfaces while the board is being inserted.

It is another object to provide such apparatus which requires no compromise between wear-resistant plating for the contacts and that surface which provides the best electrical conduction across the boundary.

It is another object to provide such apparatus which is not susceptible to contact damage due to a false or misaligned insertion.

It is another object to provide such apparatus which is, by a positive latching locked in place automatically independently and without auxiliary locking bars, or the like.

It is another object to provide such apparatus which has wide dimensional tolerances in its manufacture.

It is another object to provide such apparatus in which the panel, when deliberately released, is totally free and requires no additional force as from sliding contact friction in withdrawing it from the receptacle.

It is another object to provide such apparatus which is compact and inexpensive to manufacture.

In accordance with one example of the present invention, these and other objects are achieved by providing an etched circuit board which inserts into a toggle-tripping receptacle. The board has a row of contact areas along one edge; and when that edge is inserted into the receptacle, it trips a toggle joint formed by a pair of elongated toggle blocks which are retained under a transverse compression by a holding means. When the toggle joint is tripped by being pushed with the board beyond its dead center, the toggle blocks with electrical contacts thereon come to bear firmly and positively from opposite directions against the contact areas of the inserted board. The toggle blocks have locking pins which insert into mating recesses in the circuit board and thereby lock the board positively in place until the toggle joint is tripped by a trigger means which urges the joint in the opposite direction past its dead center.

Thus the contacts experience substantially no abrasive sliding or scrubbing action and may therefore be woven wire gauze or "fuzz" buttons which make excellent, reliable multi-point contact quite independently of their dimensions or the force with which they are held in contact.

The novel features and their operation, as well as additional objects and advantages, will become apparent and be best understod from a consideration of the following description taken in connection with the accompanying drawings which are presented by way of example only, and in which.

Referring to the particular figures, it is stressed that the details shown are by way of example only and are presented in the cause of providing what is believed to be the most useful and readily understood description of the principles of the invention. The detailed showing is not to be taken as a limitation upon the scope of the invention which is to be measured by the appended claims forming a part of this specification.

Figures 1, 2:
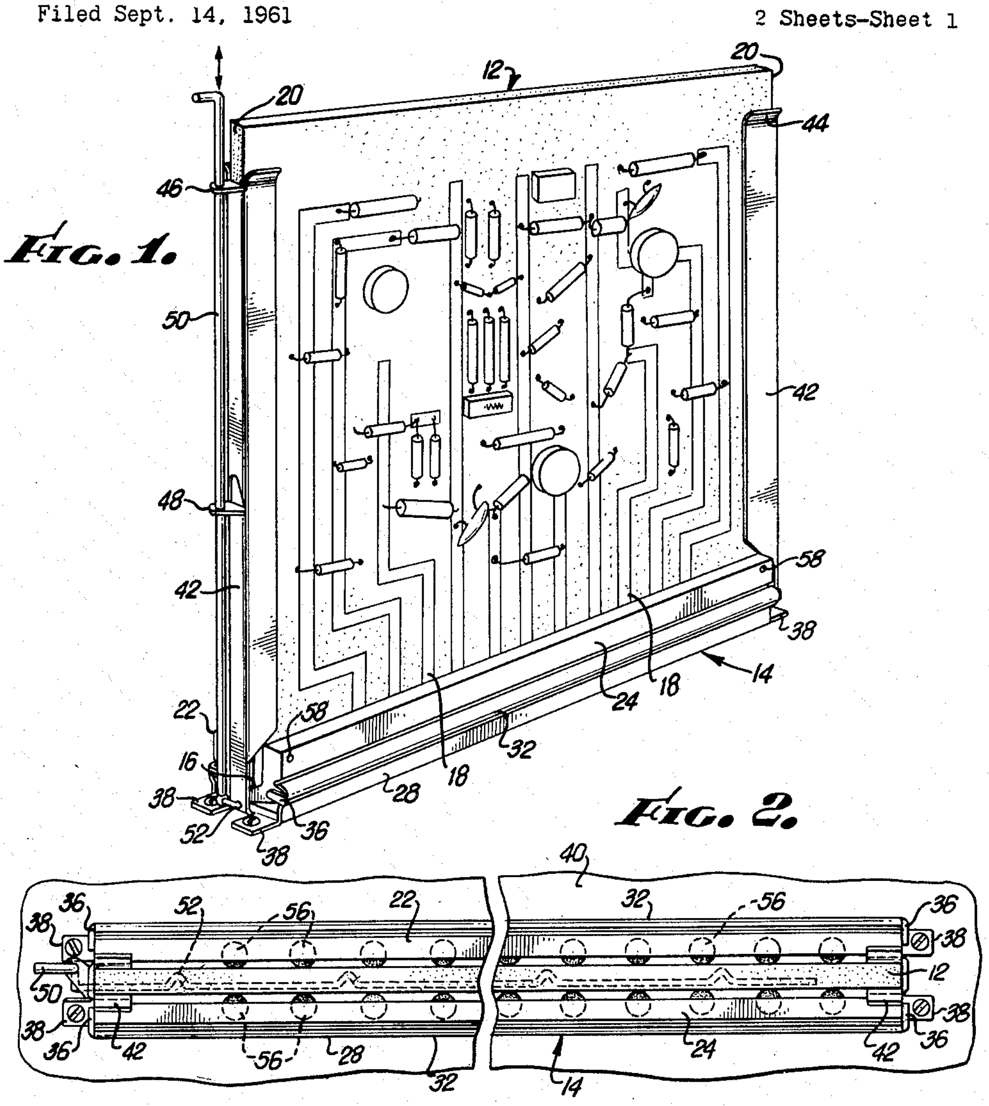
FIG. 1 is a perspective view of an etched circuit board and a toggle tripping receptacle constructed in accordance with one embodiment of the present invention.
FIG. 2 is a plan view of the structure of FIG. 1.

In FIG. 1 there is shown an etched circuit panel or board 12 which is inserted into a toggle tripping receptacle 14. The board 12 in this example is substantially rectangular and has one lineal edge 16 disposed within the receptacle and extending along the length of the base of the receptacle 14. Disposed on either or both faces of the board 12 contiguously to the lineal edge 16 are a plurality of electrical contact areas 18 which may be etched on the board 12 and which communicate with other circuitry on the board. The board 12 has a pair of ends 20 which are substantially orthogonal to the edge 16.

Figure 3:
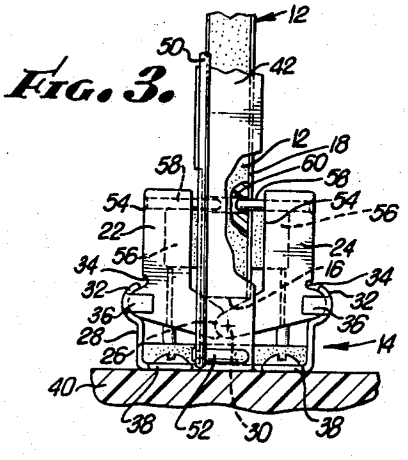
FIG. 3 is an elevational view, partly in section, of a portion of the structure of FIG. 1.

The receptacle 14 includes a pair of elongated toggle blocks 22, 24 which are mated along their length to form a toggle joint 26. The toggle joint 26 is maintained in compression and the toggle blocks 22, 24 are retained and supported by a resilient, compression retainer or holder 28. The toggle action of the joint 26 is about an elongated toggle axis 30 which translates laterally parallel to itself in a plane which is parallel to the plane of a board 12 when it is inserted in the receptacle 14. The toggle action includes a dead center which is determined by the intersection of the resultant line of compressive force exerted on the toggle joint 26 by the resilient holding portion 32 of the holder 28 and the plane of lateral translation of the toggle axis 30. Thus the toggle axis may be translated in a downward direction as viewed in FIG. 3 or in an upward direction through the dead center until a stopping means halts any further upward motion of the toggle axis. The stopping means in this example is a longitudinal channel 34 which receives the upper longitudinal edge of the holding portions 32 of the holder 28.

Constructed integrally with the resilient holder 28 may be a set of tab ends 36 which retain the toggle blocks 22, 24 longitudinally. A second set of perforated tabs 38 are provided for securing the assembly to a base member 40. A panel or circuit board guide extension 42 may be provided at either or both ends of the holder 28 for receiving and guiding the etched circuit board 12 into and out of the receptacle 14. The upper ends 44 of the guide extensions 42 may be funneled or flared as shown to aid in the insertion of the baord. One or more of the guide extensions may have a pair of perforated tabs 46, 48 for supporting and guiding a toggle tripping trigger or release member 50. The perforated tabs 46, 48 permit a longitudinal motion of the toggle release member 50. A toggle release eccentric 52 extends along at least a portion of the length of the receptacle 14, and as shown more clearly in subsequent figures, is operable by its connection with the toggle release member 50 to press against the toggle joint 26 and drive the toggle axis 30 upwardly past its dead center thereby to open the receptacle for the insertion or removal of a printed circuit board 12. Because such action takes the toggle joint beyond its dead center, the toggle blocks 22, 24 are stable and remain open or separated until such time as the toggle joint is driven in the reverse direction as by the insertion of the board 12. The edge 16 of the board may conveniently be utilized as the driving member for pushing the toggle joint in the downward direction thereby snapping the toggle blocks toward each other to receive the board 12.

Each of the toggle blocks has a contact holding surface portion 54 along which are disposed a plurality of spaced electrical contactors 56 which are so spaced as to make contact with predetermined ones of the electrical contact areas 18 on the board 12 when it is inserted into the receptacle 14. The nature and construction of the contactors 56 will be described in more detail in connection with the subsequent figures.

For the purposes of providing proper and accurate alignment of the board 12 when it is inserted into the receptacle 14 and for locking it securely in place against any vibration or spurious force, there is provided, in this example, a set of locking pins 58, constituting one locking means, which project from the surface portions 54 of the toggle blocks and engage a matching set of pin locking holes or recesses 60, constituting another locking means, in the face or faces of the board 12; the two locking means, as shown, being of the character to mate lockingly when engaged.

Figures 4, 8:
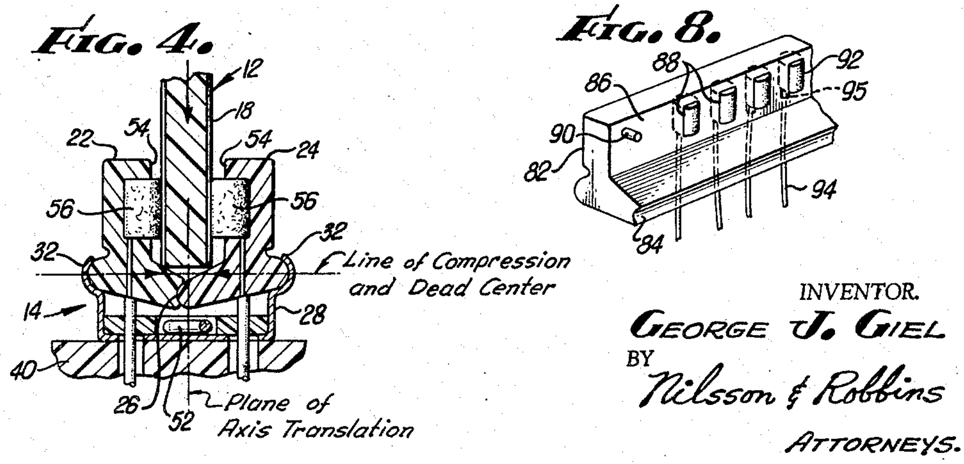
FIGS. 4 and 5 are cross-sectional views of a portion of an alternative embodiment of the present invention.
FIGS. 8, 9 and 10 are perspective views of a portion of the present invention, each illustrating different forms of woven wire contact buttons.
Figure 5:
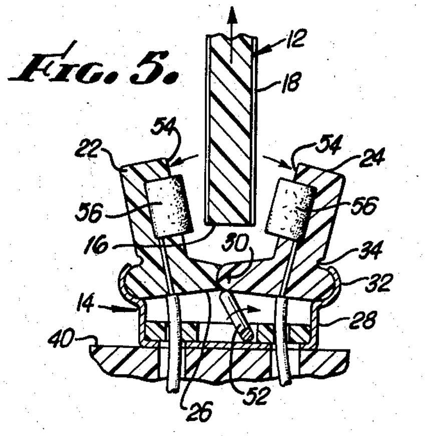

Referring to FIGS. 4 and 5, an embodiment similar in most respects to that of the previous figures is shown in the two different stable states of the toggle joint 26. In FIG. 4 the board 12 with its electrical contact areas 18 is shown inserted into the receptacle 14 and under compression between the electrical contactors 56 due to the compressive forces of the resilient holder 28. The resultant compressive force is indicated in the figure as a line of compression and dead center. It is to be noted that the only stop for the toggle joint 26 in the downward direction is the board 12 so that there is always a contact pressure between the electrical contact areas 18 and the contactors 56, even if dust or other foreign matter happens to collect between the toggle joint and the bottom of the holder 28.

When the toggle release eccentric 52 is rotated as shown in FIG. 5, the toggle joint 26 is driven upwardly so that the toggle axis 30 is translated upwardly along the plane of translation past the dead center of the toggle joint. Thusly the surface portions 54 are snapped apart away from the plane of translation of the axis and the board 12 which is then totally free to be removed from the receptacle. In fact, the board may be at least partially ejected from the receptacle by the snapping action of the toggle joint 26 as it snaps past its dead center in the upward direction.

Figure 6:
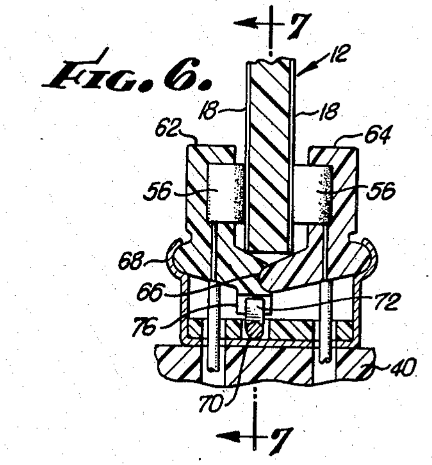
FIG. 6 is a cross-sectional view of a portion of another embodiment of the present invention.
Figure 7:
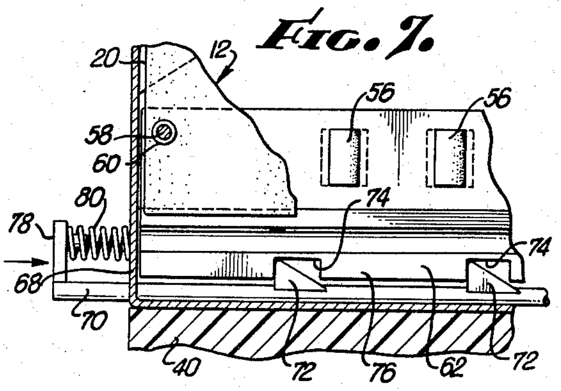
FIG. 7 is a longitudinal sectional view of the structure of FIG. 6 taken along the lines 7—7 thereof.

Referring to FIGS. 6 and 7, a form of the invention alternative to that of the previous figures is illustrated. In this embodiment, the printed circuit board 12 is shown inserted between a pair of toggle blocks 62, 64 which are jointed together along a toggle joint 66. As in the structure illustrated in the previous figures, the toggle joint 66 is held under compression and provided with a toggle action by a resilient holder 68. In this embodiment, however, the toggle joint 66 is released or driven upwardly in the drawing by a shaft 70 which extends longitudinally of the toggle blocks 62, 64 and has a plurality of inclined plane shoulders 72. Mounted on the toggle block 62 is a matching set of notches 74 relieved at spaced intervals along its lower extended portion 76. Thus when the shaft 70 is displaced inwardly or to the right in FIG. 7 the toggle blocks 62 and, accordingly, the toggle joint 66 are driven upwardly past its dead center to eject and disengage the panel or board 12. The shaft 70 may be longitudinally moved by exerting force as by a finger pressed against an enlarged end 78 of the shaft 70. The shaft 70 in this example, is returned to its original position by a spring 80 disposed in compression between the enlarged end 78 and the body of the holder 68.

Figure 9:
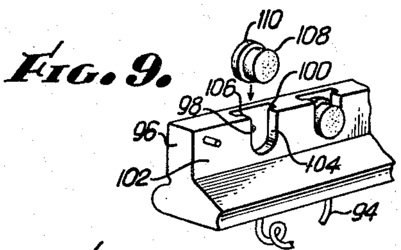
Figure 10:
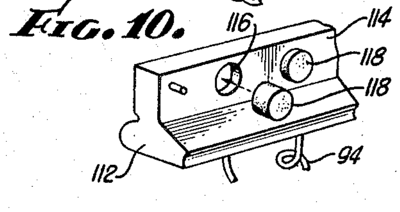

Referring to FIGS. 8, 9 and 10, different forms of the electrical contactor generally referred to by the reference numeral 56 in the previous figures, are shown in clearer detail. In FIG. 8 a portion of a toggle block 82 is shown having a portion of a toggle joint 84 disposed along its length and a surface portion 86 along which are disposed a plurality of retaining recesses 88 and a panel locking pin 90 similar to the locking pin 58 in the previous figures. The retaining recesses 88 in this example are each a short cylindrical hole opening through the surface portion 86 so that an appropriately dimensioned cylindrical "fuzz" button 92 may be inserted through and retained by the cylindrical recess. The relationship of the surface portion 86 to the retaining recesses 88 is such that more than half of the cylindrical volume of the "fuzz" buttons 92 is retained within the recess. The "fuzz" buttons 92 are typically woven wire gauze of a good metallic conductor, such as, for example, silver or gold plated copper. Communicating with each of the recesses 88 and the "fuzz" buttons 92 is a conductive lead 94 which may be soldered or welded to the "fuzz" buttons or may, alternatively, be terminated with an enlarged head portion 95 within the recess such that the "fuzz" buttons may be removed or replaced without interference with the lead 94.

In FIG. 9 a toggle block 96 is illustrated having an alternative type of retaining recess 98 disposed therein. An enlarged recess portion 100 is relieved from the toggle block 96 and opens to a surface portion 102 through an opening 104 which is smaller in cross-dimension than the retaining recess 100 and which forms a retaining shoulder 106 therewith. Both the opening 104 and the recess portion 100 communicates smoothly upwardly as shown in the figure to receive a cylindrical "fuzz" button 108 which is formed with an enlarged head portion 110 which slips into the recess portion 100 and is retained by the retaining shoulder 106 from any motion normal to the surface portion 102. Again conductive leads 94 are provided which communicate with the "fuzz" buttons 108.

In FIG. 10 a portion of a toggle block 112 is shown which has disposed in its surface portion 114 a plurality of cylindrical recesses 116 into which may be cemented or frictionally secured cylindrical "fuzz" buttons 118. The cylindrical length of the "fuzz" buttons 118 is appreciably greater than that of the recesses 116 so that the "fuzz" buttons project well beyond the plane of the surface portion 114, this being an important relationship with respect to each of the types of "fuzz" buttons discussed previously.

Figure 11:
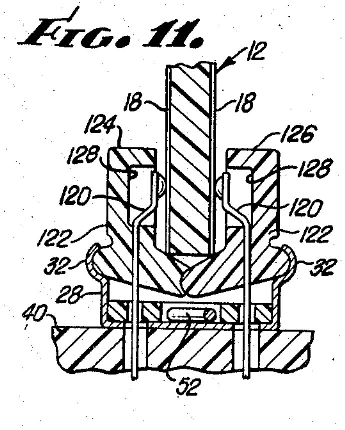
FIG. 11 is a cross-sectional view of a portion of an embodiment of the present invention utilizing solid metal spring contacts in the receptacle.

Referring to FIG. 11, an embodiment of the invention is illustrated in which solid metal contacts 120 are utilized. The contacts 120 are supported rigidly along their stem portions 122 by a pair of toggle blocks 124, 126. The contacts project through an enlarged recess 128 and are exposed toward the contact areas 18 of the board 12. The projecting portions of the contacts 120 are resilient and are terminated by highly conductive contact points which may, for example, be precious metal in solid form or in the form of woven wire gauze conductively secured to the ends of the contacts 120.

There has thus been described a modular circuitry printed circuit board and toggle receptacle therefor which permits the insertion of the circuit board into the receptacle with substantially no sliding or scrubbing between the contact surfaces but with a resultant very high contact pressure at each of the multi-point contact points, particularly when the woven wire gauze or "fuzz" buttons are utilized as described for the receptacle contact means. In addition, the advantages of utilizing the best possible contact material, whether it be wire gauze or contactors in other form, may be achieved and utilized without the contactors being susceptible to damage due to a false or misaligned insertion. The panel and the receptacle system disclosed provide, when the panel is deliberately released, as by activating the toggle release eccentric with a trigger, total freedom of the panel to be removed and does not require any force against frictionally engaged contacting means. Further, the system disclosed, including the circuit panel board, the receptacle, the locking means for securing the board in place, and the trigger means for releasing it and ejecting it, having all of the advantages discussed previously in this specification, is highly compact and readily adaptable to low cost mass production techniques.

What is claimed is:

1. Printed circuit apparatus comprising a printed circuit panel having a lineal edge along its periphery, a plurality of first electrical contact means communicating with portions of the printed circuit and disposed on said panel substantially in a row contiguously to said edge; and a toggle tripping receptacle for holding said panel and for providing electrical communication between said printed circuit and other circuitry, said receptacle comprising a pair of elongated toggle blocks coupled together along their length by a toggle joint with a toggle axis parallel to said length, compression holding means for retaining said toggle block and urging each of them along a line of compressive force toward said toggle axis whereby said toggle axis is urged to be laterally translated in a first and second sense of direction respectively along a predetermined plane away from its dead center position which is disposed at the intersection of said predetermined plane with said line of compressive force, at least one of said toggle blocks having a surface portion which is moved toward said predetermined plane when said axis is translated in said first sense of direction and which is moved away from said plane when said axis is translated in said second sense of direction, a plurality of second electrical contact means disposed on said surface portion, stopping means associated with said compressive holding means for limiting the translation of said toggle axis in said second sense of direction, said receptacle being trippable away from said stopping means when said edge of said panel is pressed against said toggle joint in said first direction whereby at least some of said first electrical contact means on said panel engage at least some of said second electrical contact means on said surface portion of said toggle blocks.

2. Printed circuit apparatus comprising: a printed circuit panel having a lineal edge along its periphery, a plurality of first electrical contact means communicating with portions of the printed circuit and disposed on said panel contiguously to said edge; and a toggle tripping receptacle for holding said panel and for providing electrical communication between said printed circuit and other circuitry, said receptacle comprising a pair of elongated toggle blocks coupled together along their length by a toggle joint with a toggle axis parallel to said length, compression holding means for retaining said toggle blocks and urging each of them along a line of compressive force toward said toggle axis whereby said toggle axis is urged to be laterally translated in a first and second sense of direction respectively along a predetermined plane away from its dead center position which is disposed at the intersection of said predetermined plane with said line of compressive force, at least one of said toggle blocks having a surface portion which is moved toward said predetermined plane when said axis is translated in said first sense of direction and which is moved away from said plane when said axis is translated in said second sense of direction, a plurality of woven wire electrical contact means disposed on said surface portion, stopping means associated with said compressive holding means for limiting the translation of said toggle axis in said second sense of direction, said receptacle being trippable away from said stopping means when said edge of said panel is pressed against said toggle joint in said first direction whereby at least some of said first electrical contact means on said panel engage at least some of said woven wire gauze electrical contact means on said surface portion of said toggle blocks.

3. Printed circuit apparatus comprising: a printed circuit panel having a lineal edge along its periphery, a plurality of first electrical contact means communicating with portions of the printed circuit and disposed on said panel contiguously to said edge; and a toggle tripping receptacle for holding said panel and for providing electrical communication between said printed circuit and other circuitry, said receptacle including a pair of elongated toggle blocks coupled together along their length by a toggle joint with a toggle axis parallel to said length, compression holding means for retaining said toggle blocks and urging each of them along a line of compressive force toward said toggle axis whereby said toggle axis is urged to be laterally translated in a first and second sense of direction respectively along a predetermined plane away from its dead center position which is disposed at the intersection of said predetermined plane with said line of compressive force, at least one of said toggle blocks having a surface portion which is moved toward said predetermined plane when said axis is translated in said first sense of direction and which is moved away from said plane when said axis is translated in said second sense of direction, a plurality of woven wire electrical contact means disposed on said surface portion, stopping means associated with said compressive holding means for limiting the translation of said toggle axis in said second sense of direction, said receptacle being trippable away from said stopping means when said edge of said panel is pressed against said toggle joint in said first direction whereby at least some of said first electrical contact means on said panel engage at least some of said woven wire electrical contact means on said surface portion of said toggle blocks, and trigger means disposed contiguously to said toggle joint on its side toward said first sense of direction for translating said toggle axis past said dead center in said second sense of direction to move said surface portion away from said plane and eject said panel from said receptacle.

4. A printed circuit component comprising: an electrically connecting and mechanically holding receptacle and a panel of printed circuitry which may be inserted into said receptacle and readily removed therefrom, said panel including a first lineal edge and a second lineal edge disposed substantially orthogonally to each other, a plurality of electrical contact areas disposed on said panel contiguously to said first edge and communicating with said printed circuitry; said receptacle comprising a pair of toggle blocks elongated along a toggle axis and disposed in mutual contact to form a toggle joint along said axis, resilient retaining means disposed against said toggle blocks to confine them and to urge them together along said joint with a resultant compressive force along a line determining the dead center of said toggle joint, said resilient retaining means being adapted to permit and to urge the lateral translation of said toggle axis in a first and a second sense of direction away from said dead center in substantially a plane perpendicular to said line, a surface portion disposed on each of said toggle blocks exposed toward said plane, said surface portions being disposed further apart to permit the insertion of said panel therebetween when said axis is translated in said second direction and being disposed closer to each other to preclude the removal of said panel when said axis is translated in said first direction, a plurality of electrical contact means disposed continguously to each of said surface portions, a panel guide affixed to said toggle blocks and adapted to engage said second lineal edge of said panel for aligning said panel substantially parallel with said plane, stopping means for limiting said translation of said axis in said second direction, said toggle blocks and said retaining means being of the character such that when said axis is translated to its limit in said second direction, said first edge of said panel and said contact areas are insertable between said surface areas and said contact means of said toggle blocks, whereby said toggle axis is urged in said first direction past said dead center to close said surface areas towards said panel and provide engagement between ones of said electrical contact areas on said panel and predetermined ones of said electrical contact means on said toggle blocks, and tripping means for disengaging said contact areas and contact means and at least partially ejecting said panel out of said receptacle along said plane in said second sense of direction, said tripping means comprising a trigger for applying force against said toggle joint to urge said axis in said second direction past said dead center.

5. A modular printed circuit system comprising: an electrically connecting and mechanically supporting receptacle and a board of printed circuitry which may be inserted securely into said receptacle and readily removed therefrom, said board having a first lineal edge and a second lineal edge disposed substantially orthogonally to each other, a plurality of electrical contact areas disposed substantially in a row on said board contiguously to said first edge and communicating with said printed circuitry, and a first locking means disposed on said panel; said receptacle comprising a pair of toggle blocks elongated along a toggle axis and disposed in mutual contact to form a toggle joint along said axis, resilient compressive retaining means disposed against said toggle blocks to confine them and to urge them together along said joint with a resultant compressive force along a line determining the dead center of said toggle joint, said resilient retaining means being adapted to permit and to urge the lateral translation of said toggle axis in a first and a second sense of direction away from said dead center in substantially a plane perpendicular to the said line determining said dead center, a surface portion disposed on each of said toggle blocks exposed toward said plane, said surface portions being disposed further apart to permit the insertion of said board therebetween when said axis is translated in said second direction, and being disposed closer together when said axis is translated in said first direction, a plurality of electrical contact means disposed on each of said surface portions, a circuit board guide connected with said receptacle adapted to engage said second lineal edge of said board for aligning said board substantially parallel with said plane, stopping means for limiting said translation of said axis in said second direction, second locking means disposed on said toggle blocks of the character which mate with said first locking means on said board, said toggle blocks and said retaining means being of the character that when said axis is translated to its limit in said second direction against said stopping means, said first edge of said circuit board and said contact areas are insertable between said surface portions and said contact means of said toggle blocks whereby said toggle axis is urged, by direct contact between at least one of said toggle blocks and said first lineal edge, in said first direction past said dead center to: close said surface portions toward said board, engage ones of said electrical contact areas on said panel with predetermined ones of said electrical contact means on said toggle blocks, and engage said first and said second locking means together to lock said panel into said receptacle; and tripping means for: disengaging said contact areas and contact means, releasing said locking means, and at least partially ejecting said board out of said receptacle along said plane in said second sense of direction, said tripping means comprising a trigger for applying a force against at least one of said toggle blocks to urge said axis in said second direction past said dead center.

6. A printed circuit component system comprising: an electrically connecting, mechanically holding, toggle operated receptacle and a printed circuitry panel, said panel comprising a relatively thin planar board having a pair of substantially planar faces and first and second lineal edges disposed substantially orthogonally to each other; a plurality of electrically conductive contact areas disposed in a row on at least one of said faces contiguously to said first edge and communicating with the printed circuitry on said panel, said panel being relieved to form at least one pin-locking recess near said first lineal edge; said receptacle comprising a pair of toggle blocks formed at least in part of rigid insulated plastic material and in mutual contact forming a toggle joint along a toggle axis; resilient retaining means for: confining said toggle blocks, urging them along a resultant line of compressive force toward said axis, and providing a lateral translation of said axis in a plane perpendicular to said line of force in a first and second sense of direction respectively to either side of said line of force determining a dead center position of said toggle joint; a contact holding portion disposed on each of said toggle blocks in facing relationship such that when said axis is translated in said first direction said contact holding portions close toward each other and toward said plane, and such that when said axis is translated in said second direction said portions open away from each other and away from said plane; a plurality of woven wire electrical contact buttons partially recessed in said contact holding portions and adapted to make pressing multi-point resilient positive contact with said conductive contact areas on said panel when said first edge of the panel is inserted between said portions and said axis is translated in said first direction past said dead center position; conductive means associated with said toggle blocks for coupling said contact buttons to other circuitry; at least one locking pin disposed contiguously to at least one of said portions which mates with said at least one locking recess of said panel to assure a predetermined register of said contact buttons and said contact areas and to lock securely said panel into said receptacle; at least one panel guide formed integrally with said retaining means for holding said panel substantially parallel with said plane; trigger means comprising an eccentric shaft having an axis parallel to said toggle axis and disposed in said first sense of direction from said toggle joint; and means for rotating said shaft about its axis whereby said joint is urged in said second sense of direction past said dead center thereby disengaging said contact buttons from said contact areas and releasing said at least one locking pin from said locking pin recess.

7. A printed circuit component comprising: an electrically connecting and mechanically holding receptacle and a panel of printed circuitry which may be inserted into said receptacle and readily removed therefrom, said panel having a first lineal edge and a second lineal edge disposed substantially orthogonally to each other, a plurality of electrical contact areas disposed on said panel contiguously to said first edge and communicating with said printed circuitry, a first locking means disposed on said panel; said receptacle comprising a pair of toggle blocks elongated along a toggle axis and disposed in mutual contact to form a toggle joint along said axis, resilient retaining means disposed against said toggle blocks to confine them and to urge them together along said joint with a resultant compressive force along a line determining the dead center of said toggle joint, said resilient retaining means being adapted to permit and to urge the lateral translation of said toggle axis in a first and a second sense of direction away from said dead center in substantially a plane perpendicular to said line, a surface portion on each of said toggle blocks disposed toward said plane and toward each other, said surface portions being disposed further apart to permit the insertion of said panel therebetween when said axis is translated in said second direction and being disposed closer to each other to preclude the removal of said panel when said axis is translated in said first direction, a plurality of wire gauze electrical contact means disposed on each of said surface portions, a panel guide adapted to engage said second lineal edge of said panel for aligning said panel substantially parallel with said plane, stopping means for limiting said translation of said axis in said second direction, said toggle blocks and said retaining means being of the character that when said axis is translated to its limit in said second direction, said first edge of said panel and said contact areas are insertable between said surface areas and said contact means of said toggle blocks, whereby said toggle axis is urged in said first direction past said dead center to close said surface areas towards said panel and provide engagement between ones of said electrical contact areas on said panel and predetermined ones of said wire gauze electrical contact means on said toggle blocks, and tripping means for disengaging said contact areas and contact means and at least partially ejecting said panel out of said receptacle along said plane in said second sense of direction, said tripping means comprising a trigger for applying force against said toggle joint to urge said axis in said second direction past said dead center.

8. A modular printed circuit system comprising: an electrically connecting and mechanically supporting receptacle and a board of printed circuitry which may be inserted securely into said receptacle and readily removed therefrom, said board having a first lineal edge and a second lineal edge disposed substantially orthogonally to each other, a plurality of electrical contact areas disposed on said board contiguously to said first edge and communicating with said printed circuitry, and a first locking means disposed on said board; said receptacle comprising a pair of toggle blocks elongated along a toggle axis and disposed in mutual contact to form a toggle joint along said axis, resilient compressive retaining means disposed against said toggle blocks to confine them and to urge them together along said joint with a resultant compressive force along a line determining the dead center of said toggle joint, said resilient retaining means being adapted to permit and to urge the lateral translation of said toggle axis in a first and a second sense of direction away from said dead center in substantially a plane perpendicular to the said line determining said dead center, a surface portion disposed on each of said toggle blocks exposed toward said plane, said surface portions being disposed further apart to permit the insertion of said board therebetween when said axis is translated in said second direction, and being disposed closer together to preclude the removal of said board when said axis is translated in said first direction, a plurality of woven wire gauze electrical contact means retained in and carried by said toggle blocks in the region of each of said surface portions, a circuit board guide carried by said retaining means and adapted to engage slidingly said second lineal edge of said board for aligning said board substantially parallel with said plane, stopping means for limiting said translation of said axis in said second direction, second locking means disposed on said toggle blocks of the character which matingly engage with said first locking means on said board, said toggle blocks and said retaining means being of the character that when said axis is translated to its limit in said second direction against said stopping means, said first edge of said circuit board and said contact areas are insertable between said surface portions and said contact means of said toggle blocks whereby said toggle axis is urged, by inserting said first lineal edge against at least one of said toggle blocks, in said first direction past said dead center to: close said surface portions toward said board, engage ones of said electrical contact areas on said panel with predetermined ones of said wire gauze electrical contact means on said toggle blocks, and engage said first and said second locking means together to lock said panel into said receptacle; and tripping means carried by said retaining means for: disengaging said contact areas and wire gauze contact means, releasing said locking means, and at least partially ejecting said board out of said receptacle along said plane in said second sense of direction, said tripping means comprising a trigger for applying a force against said toggle joint to urge said axis in said second direction past said dead center.

References Cited in the file of this patent

UNITED STATES PATENTS

| | | |
|---|---|---|
| 410,265 | Blackwell | Sept. 3, 1889 |
| 2,711,523 | Willis | Oct. 21, 1955 |
| 2,730,683 | Ayers et al. | Jan. 10, 1956 |
| 2,825,037 | French | Feb. 25, 1958 |
| 2,857,577 | Vanderpool | Oct. 21, 1958 |
| 2,893,777 | O'Neil et al. | July 7, 1959 |

FOREIGN PATENTS

| | | |
|---|---|---|
| 1,094,330 | Germany | Dec. 8, 1960 |